Figure 1:
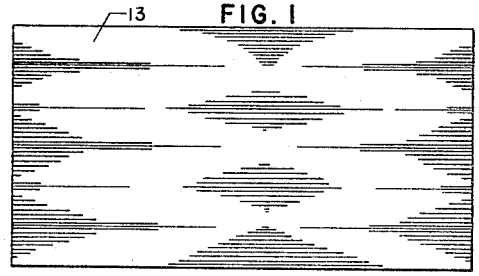

Aug. 23, 1966        L. E. LAUK        3,267,559
MULTI-CONTOURED STRUCTURES AND PROCESS
Filed Dec. 1, 1961                2 Sheets-Sheet 1

INVENTOR.
LEON E. LAUX
BY
Robert S. Berger
ATTORNEY

Aug. 23, 1966  L. E. LAUK  3,267,559
MULTI-CONTOURED STRUCTURES AND PROCESS

Filed Dec. 1, 1961  2 Sheets-Sheet 2

*INVENTOR.*
*LEON E. LAUX*
BY
Robert S. Berger
*ATTORNEY*

United States Patent Office 3,267,559
Patented August 23, 1966

3,267,559
MULTI-CONTOURED STRUCTURES
AND PROCESS
Leon E. Laux, Towson, Md., assignor to Martin-Marietta
Corporation, Baltimore, Md., a corporation of Maryland
Filed Dec. 1, 1961, Ser. No. 156,327
12 Claims. (Cl. 29—157)

This invention relates to multi-contoured structures, more particularly to a regeneratively cooled rocket nozzle capable of operating continuously over extended periods of time and to a process for fabricating such structures.

The term multi-contoured as used herein shall be understood to refer to structures the outlines of which in two or more normal axes are curvatures and to exclude those curvatures which are only incidental to the offsetting of any straight piece of material. The term profile-contoured as used herein shall be understood to refer to structures the outline of which in only one axis is a curvature and to exclude those curvatures which are only incidental to the offsetting of any straight piece of material.

It is often necessary to provide a multi-contoured structure comprising either one continuous surface with structural reinforcing members contiguous therewith or two continuous surfaces with structural reinforcing and spacing members disposed therebetwen nad co-extensive therewith. The multi-contoured aspect of such a structure presents many problems in respect to the processes associated with the fabrication of these structures and results in a relatively expensive and heavy end product.

Particularly illustrative of these problems is the manufacture of reaction nozzles for use in jet motors or analogous devices such as are used in rockets, guided missiles and aircraft. It is necessary for the proper operation of such reaction nozzles to maintain the temperature of the wall of the thrust chamber below its melting point over extended periods of time. Various methods have been devised for performing this function all of which utilize the well known feature of causing a coolant to be continuously passed through the wall of the thrust chamber and along the length thereof.

Probably the most common of these methods in use today utilizes the tube-bundle type of construction. A reaction nozzle of this type consists of a cylindrical tube bundle of varying diametral dimensions, with each tube in the bundle running the length of the nozzle. Each tube must be profile-contoured to the desired nozzle contour. Each tube must also be formed so as to longitudinally present varying cross-sectional patterns to properly compensate for the varying diameter of the nozzle wall. After assembly these tubes must then be welded or brazed together.

Another method of providing a double walled nozzle chamber is to stamp or punch cylindrical metal laminations of varying inside and outside diameters containing perforations properly sized and annularly spaced. The reaction nozzle is then formed by assembling a stack of closely abutted axially aligned annular laminations, each lamination, and the perforations therein, of slightly differing dimensional proportions from the adjacent member, and joining the assembled laminations together. When properly designed and aligned the inside edges of the annular laminations define the inside wall of a reaction nozzle chamber and the perforations in the annular laminations form passages in the wall of the thrust chamber through which a coolant can be caused to flow.

Both of the above described methods as well as other methods which have been devised for providing regeneratively cooled reaction nozzles involve time consuming and expensive methods of fabrication and result in relatively heavy and costly reaction nozzles. These same disadvantages are experienced in the fabrication of any similar multi-contoured structure by processes in use today.

The object of this invention is to provide light-weight multi-contoured structures. Another object is to provide a relatively light-weight reaction nozzle which can be regeneratively cooled so as to satisfactorily perform its function over extended periods of operation. Still another object of this invention is to provide a method whereby multi-contoured structures can be fabricated simply and inexpensively.

Figure 2:
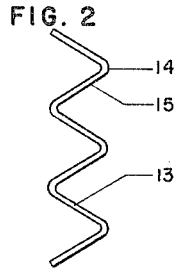
Figure 4:
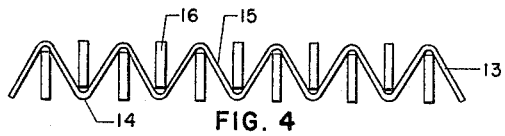
Figure 3:
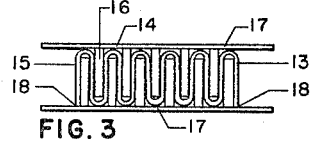
Figure 5:
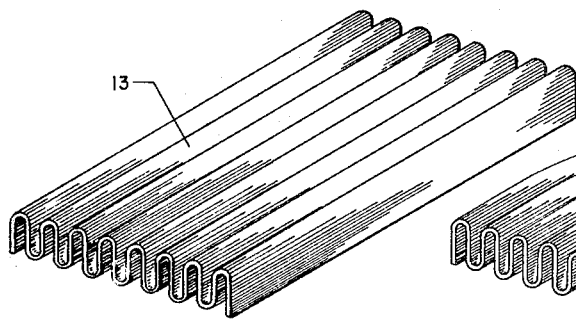
Figure 6:
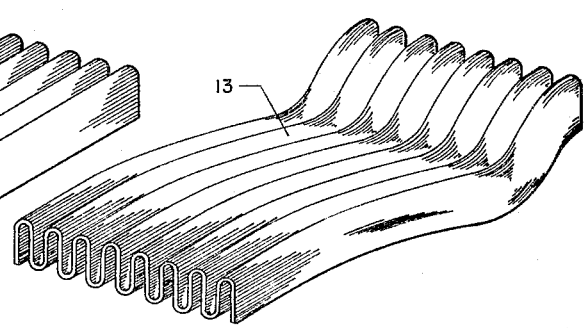
Figure 7:
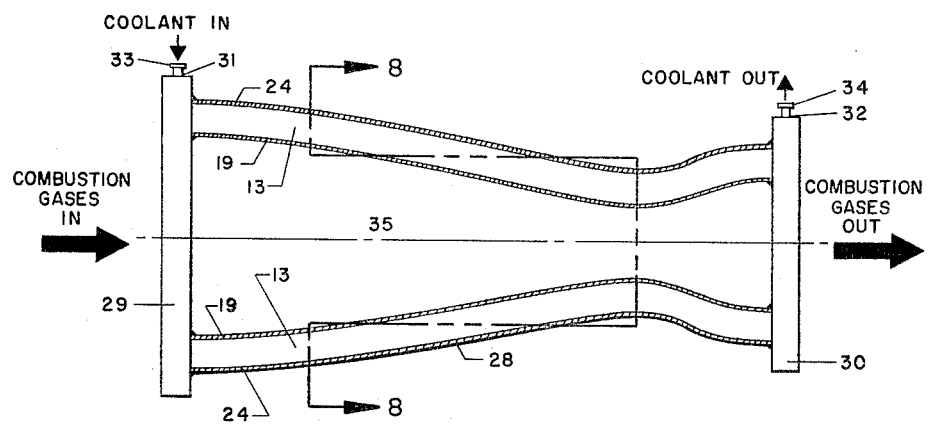
Figure 8:
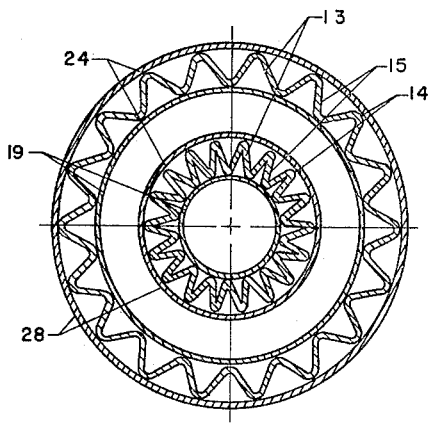
Figure 9:
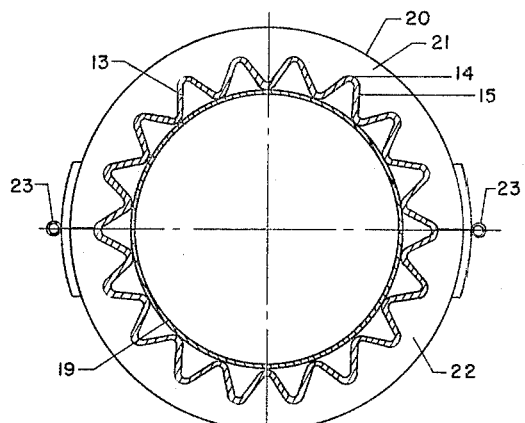
Figure 10:
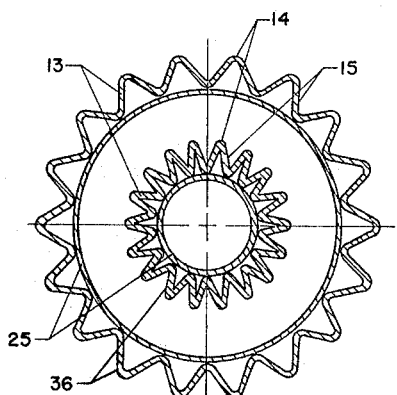
Figure 11:
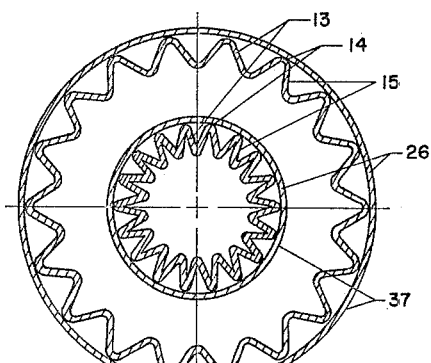
Figure 12:
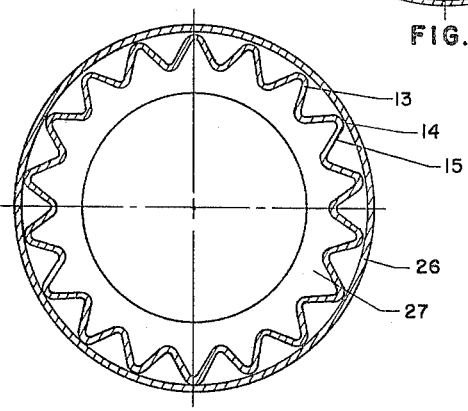

Other objects and advantages of the invention will become apparent as the following description is read in connection with the accompanying drawings in which:

FIGURE 1 is a plan view of a metal sheet after the first forming operation of this process, FIGURE 2 is an end view of the metal sheet after the first forming operation of this process showing its corrugated character, FIGURE 3 is a partial end view of the metal sheet prior to performing the third forming operation of this process, FIGURE 4 is a partial end elevation of the metal sheet prior to performing the second forming operation of this process, FIGURE 5 is a perspective view of the metal sheet after the second forming operation of this process, FIGURE 6 is a perspective view of the metal sheet after the third forming operation of this process, FIGURE 7 is a plan view of the completed structure, FIGURE 8 is a sectional view taken along line 8—8 in FIGURE 7, FIGURE 9 shows corrugation spacing collars in place during the process of fabricating the structure illustrated in FIGURES 7 and 8, FIGURE 10 shows a modification of the structure shown in FIGURE 8, FIGURE 11 shows a second modification of the structure shown in FIGURE 8, and FIGURE 12 shows the modified structure illustrated in FIGURE 11 with corrugation spacing collars in place.

In accordance with the present invention, a flat piece of sheet metal 13 is corrugated as illustrated in FIGURES 1 and 2. The corrugating operation can be performed with the use of any suitable corrugating equipment such as a standard metal brake machine, serrated rollers or a rolling mill. The corrugated sheet consists of nodes 14 and web sections 15 located between alternate nodes.

The corrugated sheet 13 is then compressed transversely with respect to the corrugations by any suitable means to bring the web sections 15 of the corrugated sheet into a substantially vertical position, while maintaining the minimum bend radii of the material. It is desirable to stabilize the now vertical web sections 15 of the corrugations in the compressed sheet 13 so as to prevent buckling during a profile-contouring operation which is to follow. This can be accomplished by the insertion of flat strips of flexible material 16 between the vertical web sections 15 of the compressed sheet 13 as illustrated in FIGURE 3, sandwiching the compressed sheet 13 between two sheets of metal 17 and confining same therebetween in the compressed configuration by welding the sheets of metal 17 to the outer longitudinal edges 18 and the two outer nodes 14 of the corrugated sheet 13. Very satisfactory results have been obtained by interposing flat strips made from soft aluminum alloys between the vertical web sections 15 of the compressed sheet 13. To facilitate compressing the corrugated sheet 13 the proper amount so as to bring the web sections 15 thereof into the vertical position while compensating for the minimum bend radii of the material, these flat strips of flexible material 16 may be interposed between the corrugations prior to applying the compressive force as shown in FIGURE 4.

The compressed corrugated sheet 13, such as that illustrated in FIGURE 5, is then formed into the desired profile-contour by one or more existing profile forming techniques such as roll forming, step forming in a standard metal brake machine or die forming. A profile-contoured corrugated metal sheet 13 is illustrated in FIGURE 6.

If the flat strips of flexible material 16 are interposed between the vertical web sections 15 of the compressed corrugated metal sheet 13 and retained therebetween by sheets of metal 17 which are welded to the compressed corrugated metal sheet as described above, this whole assembly would be subjected to the profile-contouring operation. The two sheets of metal 17 and the flat strips of flexible material 16 would thereafter be removed from the profile-contoured corrugated metal sheet 13.

The corrugated sheet 13 can also be retained in the compressed configuration during the profile-contouring step by other means equivalent to that described above where the compressed corrugated sheet 13 is sandwiched between two sheets of metal 17 and confined therebetween by welding thereto. Other means can likewise be employed to stabilize the vertical web sections 15 of the compressed corrugated sheet 13, if this is deemed desirable, during the profile-contouring step which are equivalent to the insertion of the flat strips of flexible material 16 between the vertical web sections 15 as described above. For example, both of these functions could be accomplished by placing the compressed corrugated sheet 13 in a molten low melting point alloy, preferably of lead and bismuth such as those alloys which are commercially available as Cerro-alloys. The alloy upon solidifying would thus form a casting with the compressed sheet embedded therein. After the profile-contouring operation has been performed the profile-contoured compressed corrugated sheet 13 would be removed from the alloy mold after heating it to a liquid state. If the flat strips of flexible material 16 had been interposed between the corrugations of the corrugated sheet 13 to facilitate compressing the corrugated sheet the proper amount so as to position the web sections 15 thereof into the vertical position while compensating for the minimum bend radii of the material, these flat strips of flexible material 16 would naturally be removed prior to placing the compressed corrugated sheet 13 into the molten alloy when using this alternate method. This alternate method has not been illustrated in the drawings.

Referring to FIGURES 7 and 8, which show an embodiment of a multi-contoured corrugated panel formed by this process in a specific apparatus to be explained later, the profile-contoured metal sheet 13 is then expanded around a previously prepared inner metal shell 19 and secured thereto by resistance welding all nodes 14 on the inner side of the now multi-contoured corrugated sheet 13 to the inner metal shell 19.

If desired, retention of pre-established corrugation spacing and alignment can be assured as shown in FIGURE 9 by installing and orientating corrugation spacing collars 20 serrated in the proper dimensions, at various places along the length of the multi-contoured corrugated sheet 13 and around same, after it has been expanded over the previously prepared inner metal shell 19. The corrugation spacing collars 20 are made in two pieces 21 and 22 which are joined together and held in place by clamps 23 attached thereto. The nodes 14 on the inner side of the multi-contoured corrugated sheet 13 would then be tack welded to the inner metal shell 19 at a sufficient number of points to retain the pre-established corrugation spacing and alignment, the corrugation collars 20 removed and the inner nodes 14 completely resistance welded to the inner shell 19 along their whole length.

If the multi-contoured corrugated structure is to be of a closed configuration so that the outer longitudinal edges 18 of the profile-contoured and expanded corrugated sheet 13 are brought together as is the case in the apparatus shown in FIGURES 7 and 8, these longitudinal edges 18 are welded together at the same time that the inner nodes 14 are welded to the inner metal shell.

An outer shell 24, pre-formed in two longitudinal sections, is then positioned over the outer nodes 14 of the multi-contoured corrugated metal sheet 13 and secured thereto by resistance welding the members together along the whole length of each outer node 14 of the multi-contoured corrugated metal sheet 13. The two longitudinal sections of the outer shell 24 are welded together along the length of their longitudinal edges.

Depending upon the application to be made of the multi-contoured corrugated structure, it may be desirable to have only one shell co-extensive with the multi-contoured corrugated sheet 13. A multi-contoured corrugated structure of this type is shown in FIGURE 10, wherein a multi-contoured corrugated metal sheet 13 is attached to an inner shell 25 only. Another multi-contoured corrugated structure of this type is shown in FIGURE 11, wherein a multi-contoured corrugated metal sheet 13 is attached to an outer shell 26 only.

In forming the type of multi-contoured corrugated structure illustrated in FIGURE 11, the flat profile-contoured corrugated metal sheet 13 would be expanded around or on a previously prepared mandrel (not shown). The two preformed longitudinal sections of outer shell 26 would then be positioned over the multi-contoured corrugated metal sheet 13 and joined together and to the multi-contoured corrugated metal sheet 13 as previously described. If desired, retention of pre-established corrugation spacing and alignment can be assured as shown in FIGURE 12 by installing and orientating corrugation spacing collars 27, serrated in the proper dimensions, at various places along the length of the multi-contoured corrugated metal sheet 13 and on the under surface thereof. The two preformed longitudinal sections of outer shell 26 would be positioned over the multi-contoured corrugated metal sheet 13 and welded together along the length of their longitudinal edges. The nodes 14 on the outer surface of the multi-contoured corrugated sheet 13 would then be tack welded to the outer shell 26 at a sufficient number of point to retain the pre-established corrugation spacing and alignment, the corrugation collars 27 removed and the outer nodes 14 completely resistance welded to the outer shell 26 along their whole length.

In describing the above process, reference has been made to an inner shell 19 or 25 and an outer shell 24 or 26 made of metal, which are secured to the multi-contoured corrugated metal sheet 13 by welding thereto along the length of nodes 14 thereof. It should be understood that these metal shells 19, 25, 24 or 26 can be attached to the multi-contoured corrugated metal sheet 13 by other suitable means such as by brazing or the use of mechanical fasteners. It should also be understood that, depending on the application to be made of a particular multi-contoured structure fabricated by this process, either the inner shell or outer shell, or both, of the structure can be formed of materials other than metal or of a combination of materials secured to or confined against the multi-contoured corrugated metal sheet 13 by suitable means. For instance, the outer shell of the structure can consist of a preformed metal sheet positioned over the outer nodes 14 of the multi-contoured corrugated metal sheet 13 and confined against same by a glass fiber sheet formed by wrapping glass fiber roving cylindrically around and along the length of the outer metal sheet and then curing the glass fiber roving. Alternately, glass fiber roving could be wrapped directly over the outer nodes 14 of the multi-contoured corrugated metal sheet 13 and around and along the length of same and then cured to form an outer shell. These alternate processes have not been illustrated.

Referring again to FIGURE 7, a reaction nozzle has been illustrated of the type used in jet or rocket motors, wherein the main body member 28 has been fabricated into the desired nozzle configuration by the process described herein. The main body member 28 has an outer metal shell 24, an inner metal shell 19 and a multi-contoured corrugated sheet 13 disposed therebetween and secured to the outer and inner shells by resistance welding along the whole length of the outer and inner nodes 14 of the multi-contoured corrugated sheet 13. Coolant manifolds 29 and 30 are disposed around the openings between inner shell 19 and outer shell 24 and connected therewith so that a coolant can pass into manifold 29, through the chamber enclosed by the inner shell 19 and outer shell 24 along the length of the nozzle and into manifold 30. Manifolds 29 and 30 contain openings 31 and 32, respectively, at which points coolant inlet and outlet connectors 33 and 34 are provided, respectively.

In operation the combustion gases enter the nozzle chamber 35 as illustrated in FIGURE 7, flow through the nozzle chamber where they are properly compressed and expanded by the variable cross-sectional areas of the nozzle chamber defined by the inner shell 19 and are discharged therefrom as illustrated in FIGURE 7. A coolant enters manifold 29 through inlet connector 33, flows through the coolant chamber enclosed by the inner shell 19 and outer shell 24, flows into manifold 30 and is discharged therefrom through outlet connector 34.

FIGURES 10 and 11 illustrate alternate forms of reaction nozzles wherein the main body members 36 and 37, respectively, consist of a multi-contoured corrugated sheet 13 secured to an inner shell 25 or an outer shell 26, respectively. In a reaction nozzle of either of these types the coolant would flow along the length of the nozzle and through the chamber defined by the inner shell 25 or the outer shell 26, as the case may be, and the corrugations of the multi-contoured corrugated sheet 13.

This invention may be performed and/or embodied in other ways without departing from the spirit or essential characteristics thereof. The process and embodiments of the invention described herein are therefore to be considered as in all respects illustrative and not restrictive, the scope of the invention being indicated by the appended claims, and all changes which come within the meaning and range of equivalency of the claims are intended to be embraced therein.

The invention claimed is:

1. The method of forming a multi-contoured corrugated structure comprising the steps of:
    (a) Corrugating a flat sheet of metal,
    (b) Compressing the resulting flat corrugated metal sheet transversely with respect to the corrugations,
    (c) Profile-contouring said flat corrugated metal sheet,
    (d) Expanding said profile-contoured corrugated metal sheet over a preformed inner shell,
    (e) Securing resulting multi-contoured corrugated metal sheet to said inner shell, and
    (f) Providing an outer shell over said multi-contoured corrugated metal sheet.

2. The method of forming a multi-contoured corrugated structure comprising the steps of:
    (a) Compressing a flat corrugated metal sheet transversely with respect to the corrugations,
    (b) Profile-contouring said flat compressed corrugated metal sheet, and
    (c) Expanding said sheet to the desired multi-contoured pattern.

3. The method of claim 2 comprising the additional steps of inserting strips of flexible material between the corrugations of said sheet prior to the step of compressing said sheet and removing said strips of flexible material after the step of profile-contouring said sheet.

4. The method of claim 2 comprising the following additional steps:
    (a) Interposing strips of flexible material between the corrugations of the compressed flat corrugated metal sheet prior to the step of profile-contouring said sheet,
    (b) Retaining said strips between said corrugations during said profile-contouring step by securing sheets of material to said compressed flat corrugated metal sheet, said sheets of material being coextensive with and disposed adjacent to and on either side of said compressed flat corrugated metal sheet, and
    (c) Removing said strips and said secured sheets of material from said corrugated metal sheet after said profile-contouring step.

5. The method of claim 2 comprising the additional steps of embedding the flat compressed corrugated metal sheet in a low melting point alloy casting prior to performing said profile-contouring step and removing said low melting point alloy casting after the step of profile-contouring said sheet.

6. The method of forming a multi-contoured corrugated structure comprising the steps of:
    (a) Compressing a flat corrugated metal sheet transversely with respect to the corrugations,
    (b) Profile-contouring said flat corrugated metal sheet,
    (c) Expanding said profile-contoured corrugated metal sheet over a preformed inner shell, and
    (d) Securing resulting multi-contoured corrugated metal sheet to said inner shell.

7. The method of claim 6 comprising the additional step of spacing and aligning the corrugations of said multi-contoured corrugated metal sheet prior to the step of securing said multi-contoured corrugated metal sheet to said inner shell.

8. The method of claim 7 wherein the step of spacing and aligning the corrugations of said multi-contoured corrugated metal sheet is accomplished by installing corrugation collars adjacent to said multi-contoured corrugated metal sheet.

9. The method of claim 6 comprising the additional step of providing an outer shell over said multi-contoured corrugated metal sheet.

10. The method of forming a multi-contoured corrugated structure comprising the steps of:
    (a) Compressing a flat corrugated metal sheet transversely with respect to the corrugations,
    (b) Profile-contouring said flat corrugated metal sheet,
    (c) Expanding said profile-contoured corrugated metal sheet to the desired multi-contoured pattern, and
    (d) Providing an outer shell over the resulting multi-contoured corrugated metal sheet.

11. The method of claim 10 comprising the additional step of spacing and aligning the corrugations of said multi-contoured corrugated metal sheet prior to the step of providing said outer shell over said sheet.

12. The method of claim 11 wherein the step of spacing and aligning the corrugations of said multi-contoured corrugated metal sheet is accomplished by installing corrugation collars adjacent to said multi-contoured corrugated metal sheet.

References Cited by the Examiner

UNITED STATES PATENTS

| | | | |
|---|---|---|---|
| 2,686,957 | 8/1954 | Koerper | 29—157.3 |
| 2,892,253 | 6/1959 | Hutchins et al. | 29—421 |
| 2,927,369 | 3/1960 | Coblentz et al. | 29—157.3 |
| 2,968,918 | 1/1961 | Denison | 60—35.6 |
| 3,043,103 | 7/1962 | Dent et al. | 60—35.6 |

FOREIGN PATENTS

| | | |
|---|---|---|
| 1,135,405 | 8/1962 | Germany. |
| 853,720 | 11/1960 | Great Britain. |

JOHN F. CAMPBELL, *Primary Examiner.*

JULIUS E. WEST, WHITMORE A. WILTZ, S. N. GARBER, J. D. HOBART, *Examiners.*